United States Patent
Fitzpatrick et al.

(10) Patent No.: US 8,850,467 B1
(45) Date of Patent: Sep. 30, 2014

(54) SYSTEM AND METHOD FOR MONITORING VIDEO PERFORMANCE

(71) Applicants: International Business Machines Corporation, Armonk, NY (US); University College Dublin, Dublin (IE)

(72) Inventors: John Fitzpatrick, Dublin (IE); Paul B. French, Dublin (IE); James P. Galvin, Georgetown, KY (US); Patrick W. McDonagh, Dublin (IE); Patrick J. O'Sullivan, Dublin (IE)

(73) Assignees: International Business Machines Corporation, Armonk, NY (US); University College Dublin, Dublin (IL)

( * ) Notice: Subject to any disclaimer, the term of this patent is extended or adjusted under 35 U.S.C. 154(b) by 0 days.

(21) Appl. No.: 13/837,576

(22) Filed: Mar. 15, 2013

(51) Int. Cl.
- *H04H 60/33* (2008.01)
- *H04H 60/45* (2008.01)
- *H04H 60/56* (2008.01)
- *H04H 60/32* (2008.01)
- *H04H 20/14* (2008.01)
- *H04H 60/29* (2008.01)

(52) U.S. Cl.
USPC ............... 725/19; 725/9; 725/20; 725/22

(58) Field of Classification Search
None
See application file for complete search history.

(56) References Cited

U.S. PATENT DOCUMENTS

| | | | |
|---|---|---|---|
| 6,357,028 B1 | 3/2002 | Zhu | |
| 6,983,323 B2 | 1/2006 | Cantrell et al. | |
| 7,617,509 B1 * | 11/2009 | Brunheroto et al. | 725/19 |
| 8,284,259 B2 | 10/2012 | Karacali-Akyamac | |
| 2005/0262529 A1 * | 11/2005 | Neogi et al. | 725/31 |
| 2009/0276821 A1 * | 11/2009 | Amento et al. | 725/116 |

FOREIGN PATENT DOCUMENTS

| | | |
|---|---|---|
| EP | 1362485 B1 | 8/2008 |
| EP | 2 530 969 A1 | 5/2012 |

OTHER PUBLICATIONS

Mu Mu et al., "Framework for the Integrated Video Quality Assessment," Multimedia Tools and Applications, Dec. 28, 2011, pp. 1-31.

* cited by examiner

*Primary Examiner* — Justin Shepard
(74) *Attorney, Agent, or Firm* — Holland & Knight LLP; Brian J. Colandreo, Esq.; Jeffrey T. Placker, Esq.

(57) ABSTRACT

A computer-implemented method, computer program product, and computing system for receiving one or more transmitted frame identifiers that are mathematical representations of one or more transmitted video frames included within a multi-frame video. One or more video frames included within the multi-frame video are received, thus defining one or more received video frames. A mathematical representation of each of the one or more received video frames is generated, thus defining one or more received frame identifiers. The one or more received frame identifiers are compared to the one or more transmitted frame identifiers to determine a level of similarity between the one or more received video frames and the one or more transmitted video frames.

21 Claims, 4 Drawing Sheets

SYSTEM AND METHOD FOR MONITORING VIDEO PERFORMANCE

TECHNICAL FIELD

This disclosure relates to performance monitoring systems and, more particularly, to systems that monitor video performance.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs. The Internet may further be used to distribute content to users. For example, video content may be simultaneously multicast to a plurality of users in a fashion similar to the way that cable television networks transmit content to end users.

SUMMARY OF DISCLOSURE

In one implementation, a method of monitoring video performance includes receiving one or more transmitted frame identifiers that are mathematical representations of one or more transmitted video frames included within a multi-frame video. One or more video frames included within the multi-frame video are received, thus defining one or more received video frames. A mathematical representation of each of the one or more received video frames is generated, thus defining one or more received frame identifiers. The one or more received frame identifiers are compared to the one or more transmitted frame identifiers to determine a level of similarity between the one or more received video frames and the one or more transmitted video frames.

One or more of the following features may be included. The multi-frame video may be a multi-frame video being multicast to a plurality of viewers. The one or more transmitted frame identifiers may be mathematical hashes of the one or more transmitted video frames included within the multi-frame video. The one or more received frame identifiers may be mathematical hashes of the one or more received video frames included within the multi-frame video.

The one or more transmitted frame identifiers may include: a first transmitted frame identifier that is a mathematical representation of a first transmitted video frame included within the multi-frame video; and a second transmitted frame identifier that is a mathematical representation of a second transmitted video frame included within the multi-frame video. The one or more received frame identifiers may include: a first received frame identifier that is a mathematical representation of a first received video frame included within the multi-frame video; and a second received frame identifier that is a mathematical representation of a second received video frame included within the multi-frame video. Comparing the one or more received frame identifiers to the one or more transmitted frame identifiers may include: comparing the first and second received frame identifiers to the first and second transmitted frame identifiers to determine a sequence for the first and second received video frames with respect to the first and second transmitted video frames.

In another implementation, a computer program product resides on a computer readable medium and has a plurality of instructions stored on it. When executed by a processor, the instructions cause the processor to perform operations including receiving one or more transmitted frame identifiers that are mathematical representations of one or more transmitted video frames included within a multi-frame video. One or more video frames included within the multi-frame video are received, thus defining one or more received video frames. A mathematical representation of each of the one or more received video frames is generated, thus defining one or more received frame identifiers. The one or more received frame identifiers are compared to the one or more transmitted frame identifiers to determine a level of similarity between the one or more received video frames and the one or more transmitted video frames.

One or more of the following features may be included. The multi-frame video may be a multi-frame video being multicast to a plurality of viewers. The one or more transmitted frame identifiers may be mathematical hashes of the one or more transmitted video frames included within the multi-frame video. The one or more received frame identifiers may be mathematical hashes of the one or more received video frames included within the multi-frame video.

The one or more transmitted frame identifiers may include: a first transmitted frame identifier that is a mathematical representation of a first transmitted video frame included within the multi-frame video; and a second transmitted frame identifier that is a mathematical representation of a second transmitted video frame included within the multi-frame video. The one or more received frame identifiers may include: a first received frame identifier that is a mathematical representation of a first received video frame included within the multi-frame video; and a second received frame identifier that is a mathematical representation of a second received video frame included within the multi-frame video. Comparing the one or more received frame identifiers to the one or more transmitted frame identifiers may include: comparing the first and second received frame identifiers to the first and second transmitted frame identifiers to determine a sequence for the first and second received video frames with respect to the first and second transmitted video frames.

In another implementation, a computing system includes a processor and a memory system configured to perform operations including receiving one or more transmitted frame identifiers that are mathematical representations of one or more transmitted video frames included within a multi-frame video. One or more video frames included within the multi-frame video are received, thus defining one or more received video frames. A mathematical representation of each of the one or more received video frames is generated, thus defining one or more received frame identifiers. The one or more received frame identifiers are compared to the one or more transmitted frame identifiers to determine a level of similarity between the one or more received video frames and the one or more transmitted video frames.

One or more of the following features may be included. The multi-frame video may be a multi-frame video being multicast to a plurality of viewers. The one or more transmitted frame identifiers may be mathematical hashes of the one or more transmitted video frames included within the multi-frame video. The one or more received frame identifiers may be mathematical hashes of the one or more received video frames included within the multi-frame video.

The one or more transmitted frame identifiers may include: a first transmitted frame identifier that is a mathematical representation of a first transmitted video frame included within the multi-frame video; and a second transmitted frame identifier that is a mathematical representation of a second transmitted video frame included within the multi-frame video. The one or more received frame identifiers may include: a first received frame identifier that is a mathematical representation of a first received video frame included within the multi-frame video; and a second received frame identifier that is a mathematical representation of a second received video frame included within the multi-frame video. Comparing the one or more received frame identifiers to the one or more transmitted frame identifiers may include: comparing the first and second received frame identifiers to the first and second transmitted frame identifiers to determine a sequence for the first and second received video frames with respect to the first and second transmitted video frames.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
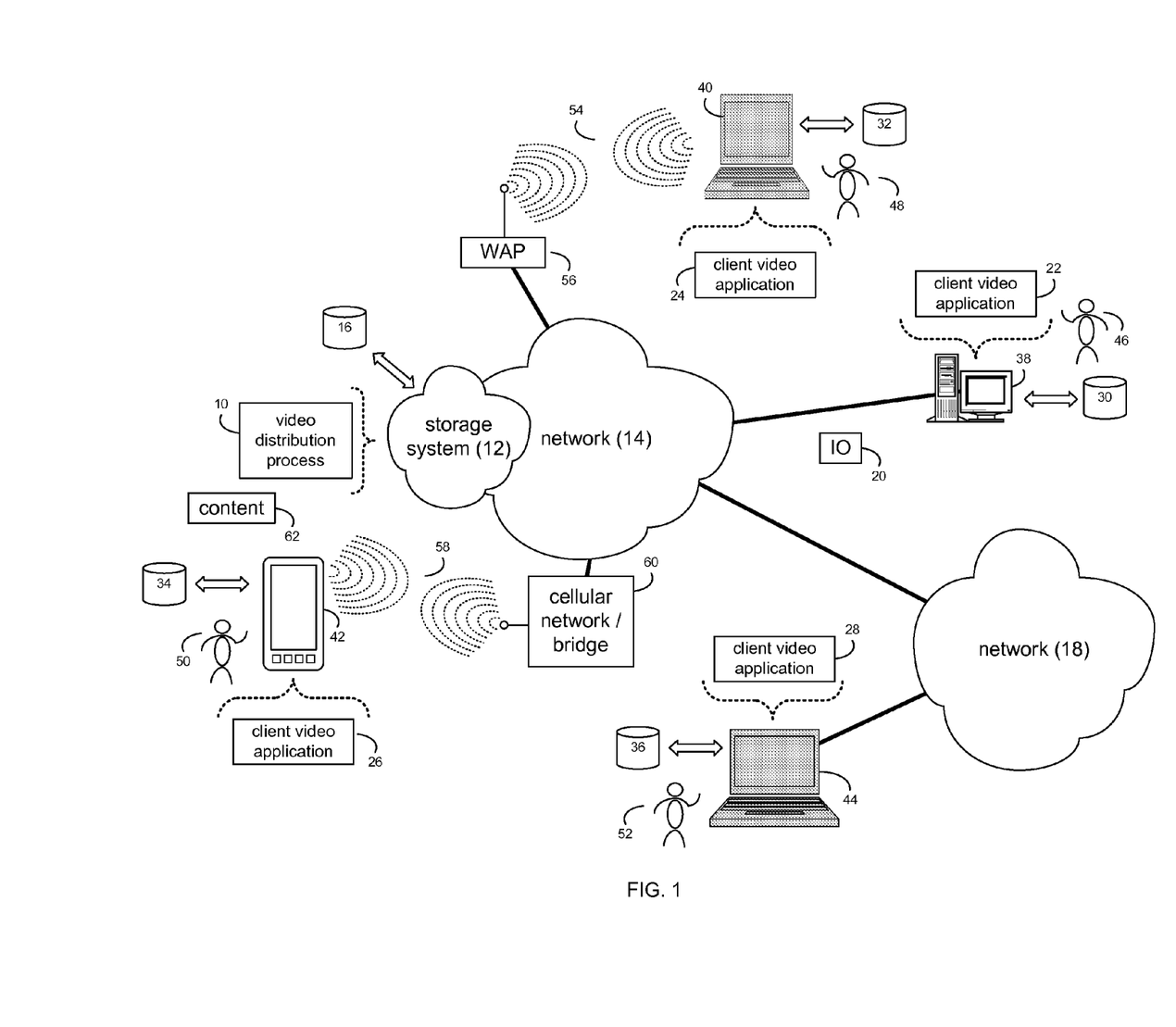
FIG. 1 is a diagrammatic view of a distributed computing network including a computing device that executes a client video application.

System Overview:

Referring to FIG. 1, there is video distribution process 10 that may reside on and may be executed by storage system 12, which may be connected with/incorporated into/a portion of network 14 (e.g., the Internet or a local area network). An example of video distribution process 10 may include, but are not limited to, one or more processes that are configured to distribute video content to one or more consumers using e.g., multicast video distribution techniques. Examples of storage system 12 may include, but are not limited to, one or more servers and/or network addressable storage devices that are configured to store and/or serve the video content being distributed by video distribution process 10.

As is known in the art, multicast video distribution is a manner in which video content may be delivered to a group of destination computers simultaneously via a single IP transmission from the source. The various components of storage system 12 may execute one or more operating systems. Network 14 may be connected to one or more secondary networks (e.g., network 18), examples of which may include but are not limited to: a local area network; a wide area network; or an intranet, for example.

Various IO requests (e.g. IO request 20) may be sent from client video applications 22, 24, 26, 28 to storage system 12. Examples of IO request 20 may include but are not limited to requests for video content available via video distribution process 10.

The instruction sets and subroutines of client video applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server computer (not shown), a data-enabled, cellular telephone (not shown), a data-enabled television (not shown), a gaming console (not shown), and a dedicated network device (not shown). Users 46, 48, 50, 52 may access storage system 12 directly through network 14 or through secondary network 18. Client electronic devices 38, 40, 42, 44 may each execute an operating system.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 54 established between laptop computer 40 and wireless access point (i.e., WAP) 56, which is shown directly coupled to network 14. WAP 56 may be, for example, an IEEE 802.11a, 802.11b, 802.11g, 802.11n, Wi-Fi, and/or Bluetooth device that is capable of establishing wireless communication channel 54 between laptop computer 40 and WAP 56. Personal digital assistant 42 is shown wirelessly coupled to network 14 via wireless communication channel 58 established between personal digital assistant 42 and cellular network/bridge 60, which is shown directly coupled to network 14.

As discussed above, video distribution process 10 may be configured to distribute video content to one or more consumers using e.g., multicast video distribution techniques. For example, assume that video distribution system 10 is configured to distribute video content 62 in a multicast fashion (e.g., video content 62 will be simultaneously distributed to a plurality of consumers of the content), as opposed to unicasting, in which an individual distribution is made for each of a plurality of consumers.

Figure 2:
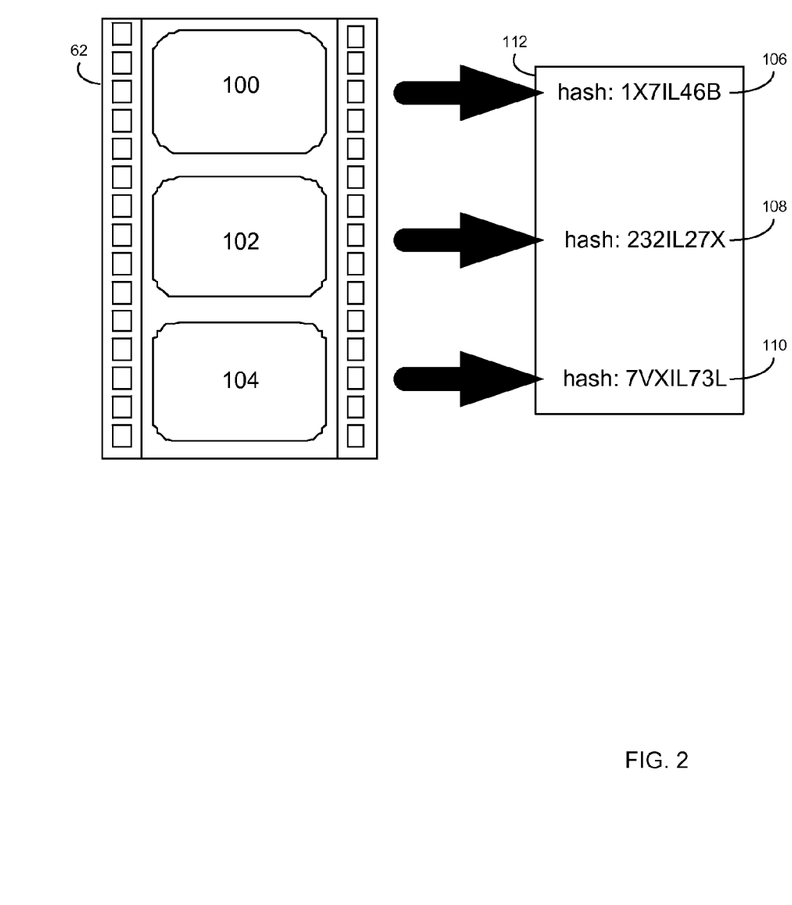
FIG. 2 is a diagrammatic representation of transmitted video content.

As is known in the art, video content may include a plurality of individual still images (i.e., video frames) that are rendered on the device of an end user in a defined sequence and at a defined rate. Referring also to FIG. 2 and for example, video content 62 may include transmitted video frames 100, 102, 104. While in this particular example, video content 62 is shown to include three video frames (namely transmitted video frames 100, 102, 104), this is for illustrative purposes only and is not intended to be a limitation of this disclosure, as other configurations are possible. For example, each second of video content 62 may include up to thirty video frames.

In order to allow client video applications 22, 24, 26, 28 to gauge the quality of the video content received by a consumer (e.g. users 46, 48, 50, 52), video distribution process 10 may process video content 62 prior to broadcasting the same. For example, video distribution process 10 may perform a mathematical function on each of the video frames included in video content 62 (e.g. transmitted video frames 100, 102, 104) to generate a mathematical representation of each transmitted video frame.

One example of such a mathematical function may include performing a hash function on each transmitted video frame to generate a transmitted frame identifier (e.g., transmitted frame identifiers 106, 108, 110) for each transmitted video frame (e.g., transmitted video frames 100, 102, 104). As is known in the art, a hash function is an algorithm/subroutine that maps large data sets to smaller data sets. The values returned by a hash function are typically called hash values, hash codes, hash sums, checksums or simply hashes. Hash functions are mostly used to accelerate table lookup or data comparison tasks such as e.g., finding items in a database and detecting duplicated or similar records in a large file. Accordingly, through the use of transmitted frame identifiers 106, 108, 110, the level of integrity of the video content received by client video applications 22, 24, 26, 28 may be determined.

Assume for illustrative purposes that users 46, 48, 50, 52 are interested in receiving/viewing video content 62. Accordingly, client video applications 22, 24, 26, 28 may provide the appropriate request (e.g., IO request 20) to video distribution process 10 requesting that video content 62 be provided (via e.g., multicasting) to client video applications 22, 24, 26, 28. Upon receiving such a request, video distribution process 10 may provide transmitted frame identifiers 106, 108, 110 (e.g., in the form of frame identifier table 112) to client video applications 22, 24, 26, 28. Video distribution process 10 may be configured to provide transmitted frame identifiers 106, 108, 110 to client video applications 22, 24, 26, 28 prior to or during the transmission of video content 62.

Further, video distribution process 10 may be configured to provide transmitted frame identifiers 106, 108, 110 to client video applications 22, 24, 26, 28 using a distribution channel that is different from/distinct from the distribution channel that is used to distribute video content 62. For example, in an MPEG Transport Stream, multiple videos of television programs may be transmitted using different distribution channels. One of these distribution channels may be used to transmit the video content (e.g., multiple frames of the video would be transmitted using the same distribution channel). In this implementation, a separate distribution channel may be used to transmit the sequence of hash values (e.g., transmitted frame identifiers 106, 108, 110) to client video applications 22, 24, 26, 28.

For the following example, the operation of client video application 22 will be discussed. However, this is for illustrative purposes only and is not intended to be a limitation of this disclosure, as other configurations are possible and are considered to be within the scope of this disclosure.

Figure 3:
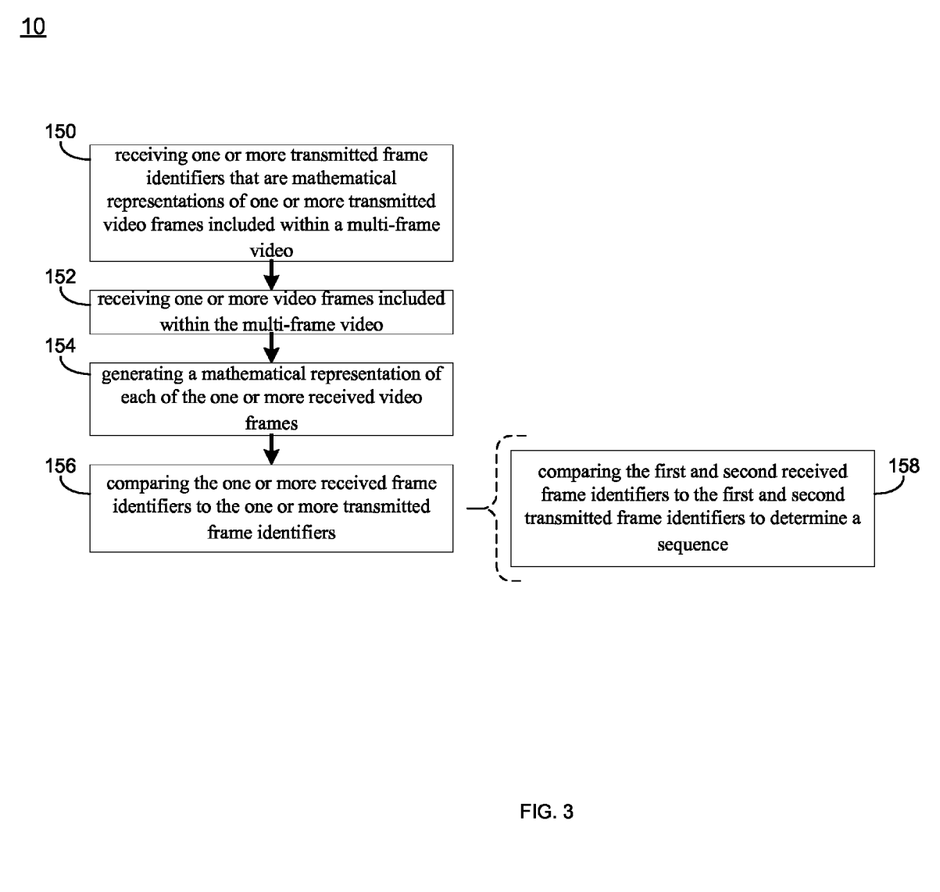
FIG. 3 is a flowchart of the client video application of FIG. 1.
Figure 4:
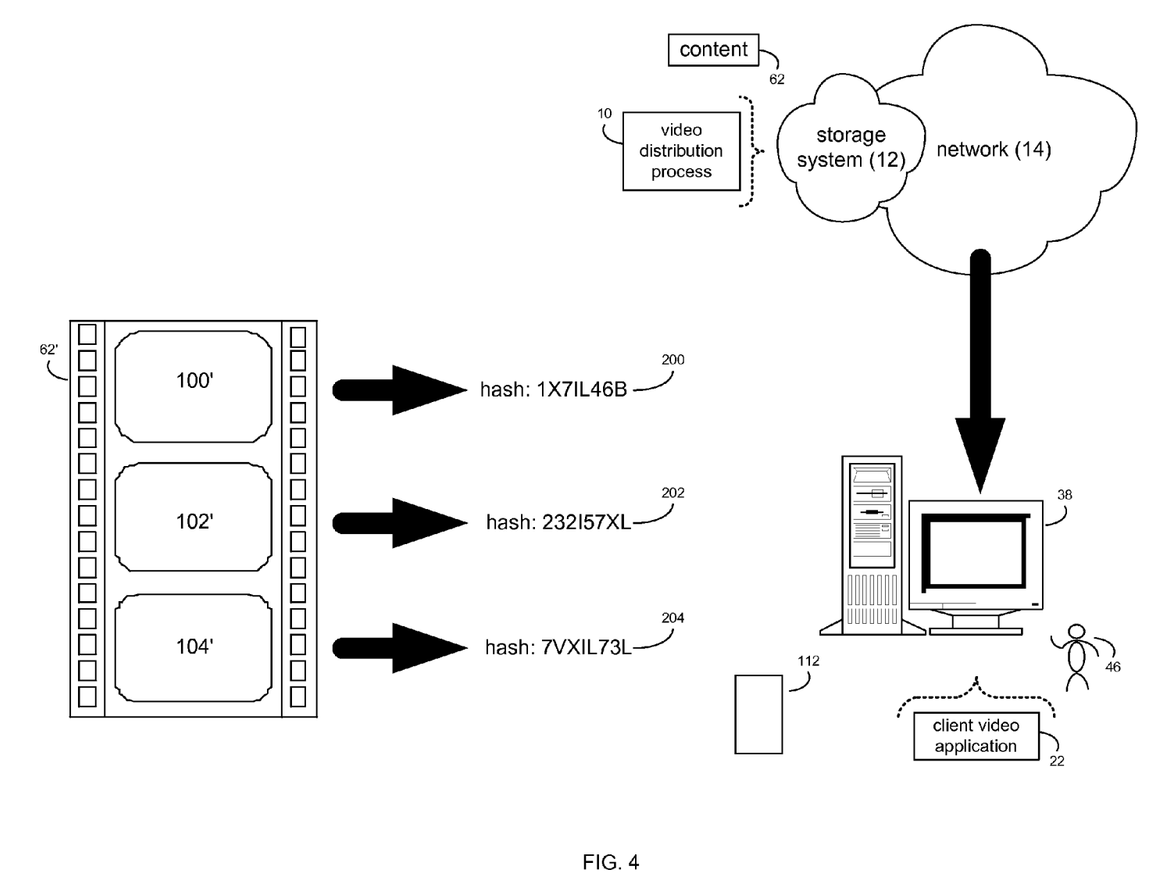
FIG. 4 is a diagrammatic representation of received video content.

Client Video Application:

Referring also to FIGS. 3-4, client video application 22 may receive 150 one or more transmitted frame identifiers (e.g., transmitted frame identifiers 106, 108, 110 in the form of frame identifier table 112) that are mathematical representations of one or more transmitted video frames (e.g., transmitted video frames 100, 102, 104) included within a multi-frame video (e.g., video content 62). Further, assume for illustrative purposes that video distribution process 10 begins to broadcast (i.e., transmit) video content 62, which is received as video content 62' (including received video frames 100', 102', 104').

As is known in the art, data (e.g., transmitted video frames 100, 102, 104) may get corrupted during transmission through a network (e.g., the internet). Accordingly, the video frames received (e.g., received video frames 100', 102', 104') by a client video application may be different (i.e., corrupted) with respect to the video frames transmitted (e.g., transmitted video frames 100, 102, 104) to the client video application.

Upon receiving 152 the video frames (e.g., received video frames 100', 102', 104') included within the multi-frame video (e.g., video content 62'), client video application 22 may generate 154 a mathematical representation (e.g., received frame identifiers 200, 202, 204) for each of the received video frames (e.g., received video frames 100', 102', 104') included within video content 62'. In order to allow for a proper comparison, the manner in which client video application 22 generates 154 received frame identifiers 200, 202, 204 should be the same as the manner in which video distribution process 10 generates transmitted frame identifiers 106, 108, 110.

As discussed above, one example of such a mathematical representation may include performing a hash function on each video frame to generate transmitted frame identifiers 106, 108, 110. Accordingly, client video application 22 may be configured to perform an equivalent hash function to generate 154 received frame identifiers 200, 202, 204.

Once received frame identifiers 200, 202, 204 are generated 154, client video application 22 may compare 156 received frame identifiers 200, 202, 204 to transmitted frame identifiers 106, 108, 110 to determine the level of similarity between received frame identifiers 200, 202, 204 and transmitted frame identifiers 106, 108, 110.

As discussed above, a hash function is an algorithm/subroutine that maps large data sets to smaller data sets. Accordingly, if the received video frame is identical to the transmitted video frame, the received frame identifier would be identical to the transmitted frame identifier. Conversely, if the received video frame is different from the transmitted video frame, the received frame identifier would be different from the transmitted frame identifier. Accordingly, by comparing corresponding received/transmitted frame identifiers, the level of similarity between the related received/transmitted video frames may be determined.

Assume for illustrative purposes that transmitted frame identifier 106 (which corresponds to video frame 100) has a hash value of 1X7IL46B. Since received frame identifier 200 (which corresponds to received video frame 100') also has a hash value of 1X7IL46B, client video application 22 may determine that video frame 100 and video frame 100' are identical (therefore, video frame 100 was not corrupted while being transmitted to client video application 22).

Further, assume that transmitted frame identifier 110 (which corresponds to video frame 104) has a hash value of 7VXIL73L. Since received frame identifier 204 (which corresponds to received video frame 104') also has a hash value of 7VXIL73L, client video application 22 may determine that video frame 104 and video frame 104' are also identical (therefore, video frame 104 was not corrupted while being transmitted to client video application 22).

However, assume that transmitted frame identifier 108 (which corresponds to video frame 102) has a hash value of 232IL27X. Since, received frame identifier 202 (which corresponds to received video frame 102') has a different hash value (namely 232I57XL), client video application 22 may determine that video frame 102 and video frame 102' are not identical (therefore, video frame 102 was corrupted while being transmitted to client video application 22). Accordingly, client video application 22 may be configured to not render such a corrupted video frame.

When comparing 156 the received frame identifiers (e.g., received frame identifiers 200, 202, 204) to the transmitted frame identifiers (e.g., transmitted frame identifiers 106, 108, 110) to determine the level of similarity between received frame identifiers 200, 202, 204 and transmitted frame identifiers 106, 108, 110, client video application 22 may compare 158 received frame identifiers 200, 202, 204 and transmitted frame identifiers 106, 108, 110 to determine a sequence for the received video frames (e.g., received video frames 100', 102', 104') with respect to the transmitted video frames (e.g., transmitted video frames 100, 102, 104).

Accordingly, if received frame identifiers 200, 202, 204 are identical to the transmitted frame identifiers 106, 108, 110 (with the exception of being out of sequence), client video application 22 may be configured to reorder the appropriate received video frames to place them into the proper sequence.

Additionally, received frame identifiers 200, 202, 204 and transmitted frame identifiers 106, 108, 110 may be utilized to determine whether video frames within video content 62' have been lost. For example, assume that one hundred transmitted frame identifiers are received, indicating that video content 62 includes one hundred frame. However, assume that when calculating the $7^{th}$ received frame identifier, it matches the $15^{th}$ transmitted frame identifier. Accordingly, client video application 22 may be configured to assume that the $7^{th}$ through the $14^{th}$ video frames have been lost.

The above-described information concerning damaged video frames, out-of-sequence video frames, and missing video frames may be provided to additional applications/processes (not shown) that may use this information to process video content 62'. For example, client video application 22 may calculate a video quality assessment based upon such information that defines e.g., the overall quality of the video content received, the level of corruption of the video content, and the level of information lost within the video content.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method of monitoring video performance comprising:
   receiving one or more transmitted frame identifiers that are mathematical representations of one or more transmitted video frames included within a multi-frame video;
   receiving one or more video frames included within the multi-frame video, thus defining one or more received video frames;
   generating a mathematical representation of each of the one or more received video frames, thus defining one or more received frame identifiers;
   comparing the one or more received frame identifiers to the one or more transmitted frame identifiers to determine a level of similarity between the one or more received video frames and the one or more transmitted video frames, wherein determining the level of similarity includes determining a sequence for the one or more received video frames with respect to the one or more transmitted video frames; and
   if at least one received video frame of the one or more received video frames is out of order, reordering the at least one out of sequence received video frame.

2. The method of claim 1 wherein the multi-frame video is a multi-frame video being multicast to a plurality of viewers.

3. The method of claim 1 wherein the one or more transmitted frame identifiers are mathematical hashes of the one or more transmitted video frames included within the multi-frame video.

4. The method of claim 1 wherein the one or more received frame identifiers are mathematical hashes of the one or more received video frames included within the multi-frame video.

5. The method of claim 1 wherein the one or more transmitted frame identifiers includes:
   a first transmitted frame identifier that is a mathematical representation of a first transmitted video frame included within the multi-frame video; and
   a second transmitted frame identifier that is a mathematical representation of a second transmitted video frame included within the multi-frame video.

6. The method of claim 5 wherein the one or more received frame identifiers includes:
   a first received frame identifier that is a mathematical representation of a first received video frame included within the multi-frame video; and
   a second received frame identifier that is a mathematical representation of a second received video frame included within the multi-frame video.

7. The method of claim 6 wherein comparing the one or more received frame identifiers to the one or more transmitted frame identifiers includes:
   comparing the first and second received frame identifiers to the first and second transmitted frame identifiers to determine the sequence for the first and second received video frames with respect to the first and second transmitted video frames.

8. A computer program product residing on a non-transitory computer readable medium having a plurality of instructions stored thereon which, when executed by a processor, cause the processor to perform operations comprising:
   receiving one or more transmitted frame identifiers that are mathematical representations of one or more transmitted video frames included within a multi-frame video;
   receiving one or more video frames included within the multi-frame video, thus defining one or more received video frames;
   generating a mathematical representation of each of the one or more received video frames, thus defining one or more received frame identifiers;
   comparing the one or more received frame identifiers to the one or more transmitted frame identifiers to determine a level of similarity between the one or more received video frames and the one or more transmitted video frames, wherein determining the level of similarity includes determining a sequence for the one or more received video frames with respect to the one or more transmitted video frames; and
   if at least one received video frame of the one or more received video frames is out of order, reordering the at least one out of sequence received video frame.

9. The computer program product of claim 8 wherein the multi-frame video is a multi-frame video being multicast to a plurality of viewers.

10. The computer program product of claim 8 wherein the one or more transmitted frame identifiers are mathematical hashes of the one or more transmitted video frames included within the multi-frame video.

11. The computer program product of claim 8 wherein the one or more received frame identifiers are mathematical hashes of the one or more received video frames included within the multi-frame video.

12. The computer program product of claim 8 wherein the one or more transmitted frame identifiers includes:
    a first transmitted frame identifier that is a mathematical representation of a first transmitted video frame included within the multi-frame video; and a second transmitted frame identifier that is a mathematical representation of a second transmitted video frame included within the multi-frame video.

13. The computer program product of claim 12 wherein the one or more received frame identifiers includes:
- a first received frame identifier that is a mathematical representation of a first received video frame included within the multi-frame video; and
- a second received frame identifier that is a mathematical representation of a second received video frame included within the multi-frame video.

14. The computer program product of claim 13 wherein comparing the one or more received frame identifiers to the one or more transmitted frame identifiers includes:
- comparing the first and second received frame identifiers to the first and second transmitted frame identifiers to determine the sequence for the first and second received video frames with respect to the first and second transmitted video frames.

15. A computing system including a processor and memory configured to perform operations comprising:
- receiving one or more transmitted frame identifiers that are mathematical representations of one or more transmitted video frames included within a multi-frame video;
- receiving one or more video frames included within the multi-frame video, thus defining one or more received video frames;
- generating a mathematical representation of each of the one or more received video frames, thus defining one or more received frame identifiers;
- comparing the one or more received frame identifiers to the one or more transmitted frame identifiers to determine a level of similarity between the one or more received video frames and the one or more transmitted video frames, wherein determining the level of similarity includes determining a sequence for the one or more received video frames with respect to the one or more transmitted video frames; and
- if at least one received video frame of the one or more received video frames is out of order, reordering the at least one out of sequence received video frame.

16. The computing system of claim 15 wherein the multi-frame video is a multi-frame video being multicast to a plurality of viewers.

17. The computing system of claim 15 wherein the one or more transmitted frame identifiers are mathematical hashes of the one or more transmitted video frames included within the multi-frame video.

18. The computing system of claim 15 wherein the one or more received frame identifiers are mathematical hashes of the one or more received video frames included within the multi-frame video.

19. The computing system of claim 15 wherein the one or more transmitted frame identifiers includes:
- a first transmitted frame identifier that is a mathematical representation of a first transmitted video frame included within the multi-frame video; and
- a second transmitted frame identifier that is a mathematical representation of a second transmitted video frame included within the multi-frame video.

20. The computing system of claim 19 wherein the one or more received frame identifiers includes:
- a first received frame identifier that is a mathematical representation of a first received video frame included within the multi-frame video; and
- a second received frame identifier that is a mathematical representation of a second received video frame included within the multi-frame video.

21. The computing system of claim 20 wherein comparing the one or more received frame identifiers to the one or more transmitted frame identifiers includes:
- comparing the first and second received frame identifiers to the first and second transmitted frame identifiers to determine the sequence for the first and second received video frames with respect to the first and second transmitted video frames.

* * * * *